United States Patent
Gorti et al.

(10) Patent No.: US 9,578,168 B2
(45) Date of Patent: *Feb. 21, 2017

(54) DISTINCTIVE RING TONES PROMPTED BY CALL URGENCY AND CONTEXT

(71) Applicant: AT&T INTELLECTUAL PROPERTY I, L.P., Atlanta, GA (US)

(72) Inventors: Sreenivasa Rao Gorti, Austin, TX (US); Stephen Mark Mueller, Austin, TX (US); Jeffrey Lewis Brandt, Cedar Park, TX (US); Huitao Liu, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,081

(22) Filed: Nov. 24, 2015

(65) Prior Publication Data
US 2016/0080564 A1    Mar. 17, 2016

Related U.S. Application Data

(63) Continuation of application No. 14/486,911, filed on Sep. 15, 2014, now Pat. No. 9,237,230, which is a
(Continued)

(51) Int. Cl.
*H04M 3/42* (2006.01)
*H04W 4/00* (2009.01)
(Continued)

(52) U.S. Cl.
CPC .............. *H04M 3/4365* (2013.01); *H04M 3/02* (2013.01); *H04M 3/42051* (2013.01);
(Continued)

(58) Field of Classification Search
CPC .. H04M 3/42017; H04M 3/02; H04M 19/041; H04W 4/16; H04W 4/22; H04W 76/007
(Continued)

(56) References Cited

U.S. PATENT DOCUMENTS 5,740,532 A    4/1998    Fernandez et al.
6,359,970 B1    3/2002    Burgess
(Continued)

FOREIGN PATENT DOCUMENTS

DE    10052932 A1    5/2002
EP    1117245 A1    7/2001
EP    1202547 A2    5/2002

OTHER PUBLICATIONS

Canadian Office Action for Application No. 2,577,048, dated Jun. 9, 2009, 2 pages.
(Continued)

*Primary Examiner* — Rasha Al Aubaidi
(74) *Attorney, Agent, or Firm* — Toler Law Group, PC

(57) ABSTRACT

A method includes receiving, at a destination communication device, information related to a communication from a source communication device. The method further includes determining, at the destination communication device, a designation of the source communication device based on the information. The method further includes selecting, based on the designation, a prompt from multiple prompts. The method further includes sending the prompt from the destination communication device to the source communication device. The prompt is a request for second information related to urgency of the call.

20 Claims, 1 Drawing Sheet

Related U.S. Application Data continuation of application No. 10/930,704, filed on Aug. 31, 2004, now Pat. No. 8,867,724.

(51) Int. Cl.
  *H04M 3/436* (2006.01)
  *H04M 19/04* (2006.01)
  *H04M 3/02* (2006.01)
  *H04M 1/57* (2006.01)
  *H04W 8/18* (2009.01)

(52) U.S. Cl.
  CPC ..... *H04M 3/42153* (2013.01); *H04M 19/041* (2013.01); *H04M 1/576* (2013.01); *H04M 1/578* (2013.01); *H04M 19/048* (2013.01); *H04M 2203/2038* (2013.01); *H04W 8/18* (2013.01)

(58) Field of Classification Search
  USPC ................. 379/207.16; 455/414.1, 404.1
  See application file for complete search history.

(56) References Cited

U.S. PATENT DOCUMENTS

| | | |
|---|---|---|
| 6,418,330 B1 | 7/2002 | Lee |
| 6,650,746 B1 | 11/2003 | Groen et al. |
| 7,542,558 B2 | 6/2009 | Klein et al. |
| 8,107,601 B2 | 1/2012 | Helferich |
| 2002/0046299 A1 | 4/2002 | Lefeber et al. |
| 2002/0071546 A1 | 6/2002 | Brennan |
| 2002/0128033 A1 | 9/2002 | Burgess |
| 2002/0163999 A1 | 11/2002 | Farris et al. |
| 2003/0032414 A1 | 2/2003 | Melaku et al. |
| 2003/0041048 A1 | 2/2003 | Balasuriya |
| 2003/0223570 A1 | 12/2003 | Partanen et al. |
| 2004/0067751 A1 | 4/2004 | Vandermeijden et al. |
| 2004/0213401 A1 | 10/2004 | Aupperle et al. |
| 2005/0084082 A1 | 4/2005 | Horvitz et al. |
| 2005/0096008 A1 | 5/2005 | Shin |
| 2005/0151642 A1 | 7/2005 | Tupler et al. |
| 2005/0169446 A1 | 8/2005 | Randall et al. |
| 2005/0195802 A1 | 9/2005 | Klein et al. |
| 2005/0201362 A1 | 9/2005 | Klein et al. |
| 2006/0094404 A1 | 5/2006 | Burgess |
| 2006/0188084 A1 | 8/2006 | Rogers et al. |

OTHER PUBLICATIONS

Communication Pursuant to Article 94(3) EPC for European Application No. 05794835.8, dated Aug. 28, 2008, 3 pages.
Communication Pursuant to Article 94(3) EPC for European Application No. 05794835.8, dated Jul. 16, 2009, 2 pages.
Communication Pursuant to Article 96(2) EPC for European Application No. 05794835.8, dated Jun. 14, 2007, 7 pages.
International Search Report and Written Opinion for Application No. PCT/US2005/030866, Dated Mar. 7, 2006, 13 pages.

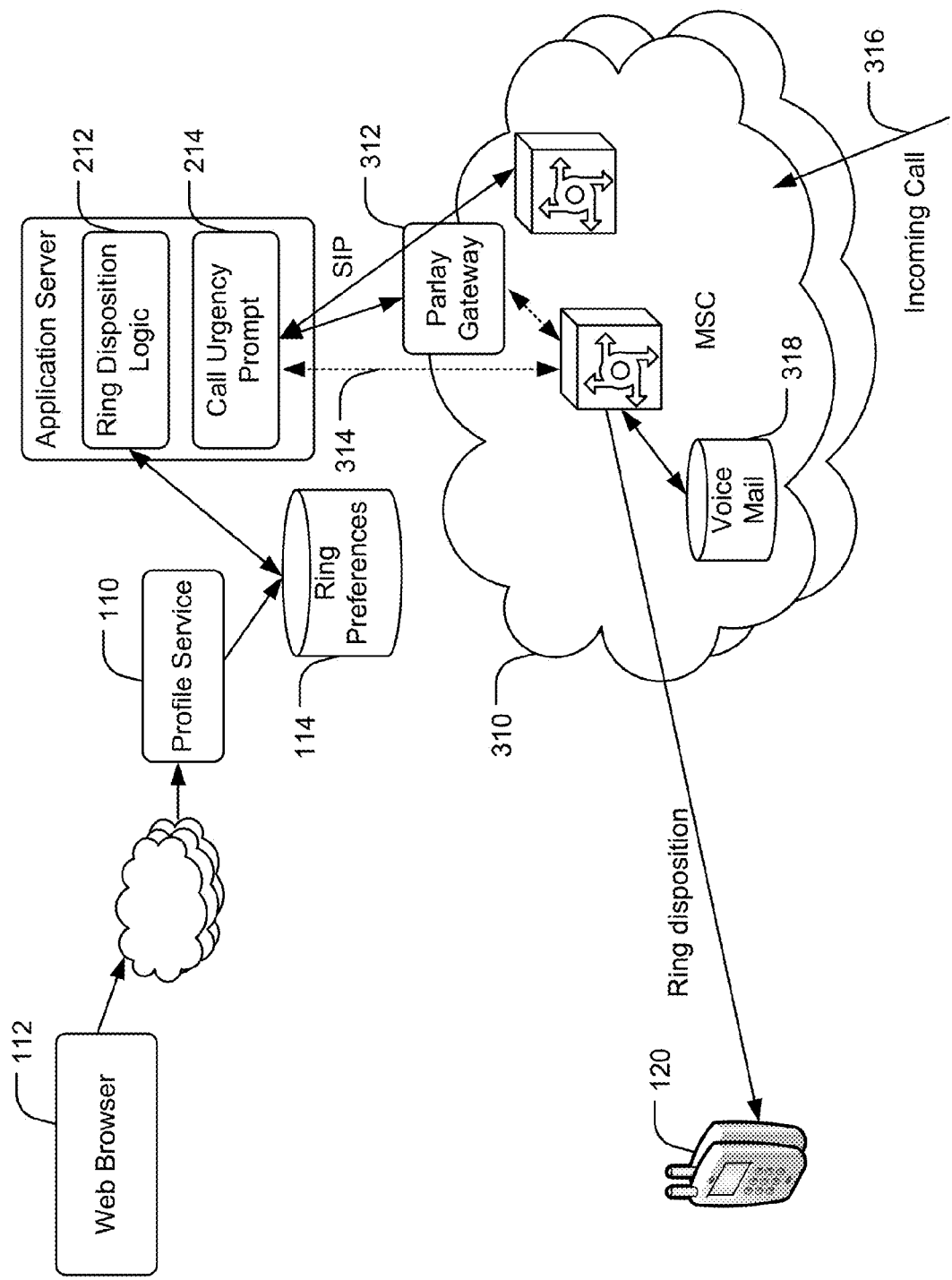

DISTINCTIVE RING TONES PROMPTED BY CALL URGENCY AND CONTEXT

CLAIM OF PRIORITY

This application claims priority from, and is a continuation of, U.S. patent application Ser. No. 14/486,911, filed Sep. 15, 2014, which is a continuation of U.S. patent application Ser. No. 10/930,704, filed Aug. 31, 2004, now issued as U.S. Pat. No. 8,867,724, which are incorporated herein by reference in their entirety.

FIELD OF THE DISCLOSURE

The present disclosure relates to telephones, cordless telephones, cell phones, pagers, and other electrical or radio terminals, and in particular to distinctive modes of notification, such as ring tones, that indicate call urgency or other context of an incoming call or message, together with systems and methods for selecting and implementing the ring tones.

BACKGROUND OF THE DISCLOSURE

A communications terminal, such as a cellular phone or a paging receiver, generates a ring tone (calling tone) or vibrates upon receipt of an incoming call or message, such as a text or an instant message ("IM"), to notify the user of the call receipt. A mobile wireless terminal such as a mobile telephone, for example, has a "terminating ring function" for informing the terminal user of an incoming voice call from other mobile wireless terminals or an incoming data call from various information providing servers. The terminating ring function includes various modes such as a vibration mode or a melody mode that outputs a ring tone to a receiving terminal.

A conventional mobile wireless terminal typically generates a single terminating ring tone designated by the user upon receipt of each incoming call. Mobile wireless terminals store a multiplicity of tones, melodies, or other modes, in its internal memory. Many cell phones support downloading melodies from a melody providing server via the Internet. The downloaded tones can also be stored in the phone's memory.

Not surprisingly, then, distinctive ringing has become a hugely popular feature with consumer and business telephony customers. Present day solutions support caller ID information that triggers the distinctive ringing. The distinctive ring is either network-actuated, i.e., the network sends the appropriate signal to the device, or is actuated by software on the client device.

On mobile phones, for example, the device interprets caller id information associated with the incoming call signal to play an appropriate ring-tone. A user may group calling party contacts and associate one or more ring-tones with each group or person in the device's memory.

BRIEF DESCRIPTION OF THE DRAWINGS

The present disclosure is further described in the detailed description that follows, by reference to the noted drawing, by way of non-limiting examples of embodiments of the present disclosure, and in which:

FIG. 1 is a block diagram of a specific embodiment of a notification mode system of the present disclosure.

DETAILED DESCRIPTION OF THE DISCLOSURE

In view of the foregoing, the present disclosure, through one or more of its various aspects, embodiments and/or specific features or sub-components, is intended to bring out one or more of the advantages that will be evident from the description. The present disclosure is described with frequent reference to phones or cell phones. It is understood that a phone is merely an example of a specific embodiment of the present disclosure, which is directed generically to communication terminals, mobile communication equipment and devices, together with attendant networks, systems and methods within the scope of the disclosure. The terminology, therefore, is not intended to limit the scope of the disclosure.

The present disclosure provides enhanced ringing features. In one or more of its various embodiments, the present disclosure provides:

(a) a more flexible user-established set of rules, customized in a subscriber profile database, that enables the ringtone to vary based on caller-id, caller priority, call-urgency (as determined by caller), call context (e.g., is the user currently filtering calls?), and so forth.

(b) call set-up logic that applies the profile rules prior to completing the call set-up. The call set-up logic, for example, enables the subscriber's phone to prompt the calling party to indicate the urgency of the call and to process the caller's reply to the prompt to select the alert or notification mode indicated by the reply.

(c) an ability to play "buzz-tones" to extend the basic distinctive ringing feature to the "silent" mode that is currently available on cell-phones. For example, one buzz may indicate a low-priority call, whereas a buzz-buzz sequence indicates a high-priority incoming call. This feature is of particular utility to subscribers with hearing disabilities.

Other kinds of alerts (audio/motion/visual) like flashing colors on a display, moving pictures (such as an animated cartoon displaying agitation or a sense of urgency) and the like, and any combination of notification modes, are contemplated by alternative embodiments.

Advantages of the present disclosure include:

1. A simple web interface to input user profile data, policies and preferences. The same profile applies across different modes of telephony such as wireline/wireless communication, text and instant messaging, paging, and so forth. An alternative embodiment provides an Interactive Voice Recognition ("IVR") system for profile data input. The profile can be applied to any type or mode of incoming communication, even in conjunction with call rerouting applications. For example, if the call disposition of a particular subscriber is to always forward to voice-mail, the profile applies to the alert for the receipt of voicemail. Likewise, for call-forwarding, the appropriate notification mode actuates at the end-use terminal of the subscriber, even if the terminal is a wireline POTS phone.

2. Call set-up logic with a highly flexible profile that extends to an arbitrary limit the basic caller-id-triggered notification. That is, the complexity of the notification protocols depends mainly on the ease of setup with the interface, and on the complexity-tolerance of the subscriber, not on any particular technical limitation. In principle, the contingency and contextual factors that differentiate ringing, and the ringing or other notification modes themselves, are readily extendable beyond the examples described herein.

3. Ring-tones to associate buzz-tones, LED flashing, and other kinds of alerts with pre-defined incoming call categories.

4. Auditory, tactile and and/or visual cues as to the urgency of the incoming call assure that the subscriber easily detects and recognizes urgent or important calls.

FIG. 1 is a block diagram of a specific embodiment of a notification mode system of the present disclosure. The system involves three components, broadly speaking Subscriber related elements are indicated by 100-series identifying numerals, application server elements are indicated by 200 series identifying numerals, and network/routing elements are indicated by series 300 identifying numbers.

Profile service 110 presents a web-based interface (or a device-specific client) 112 to user 120, represented by a mobile phone terminal. User 120 establishes a priority grouping for each contact. Priorities may be as broad as emergency/medium/low, for example, or may specify frequent callers such as kids, husband, wife, office, and so forth, and, moreover, priority categories can be cross referenced to callers in the profile database to further hone the nature of the incoming call.

For example, a matrix position identified as kids/emergency is assigned a notification mode such as loud ringing together with buzzing or vibrating and LED flashing, and indicates an injury requiring attention or transportation, whereas husband/low is assigned a melody or forwarded to voicemail and indicates an addition to a shopping list or a DVD rental request.

The user establishes a set of ring-tone identifiers 114 as discussed above, and defines ring disposition rules with, for example, simple if/then statement logic. That is, IF caller priority=MEDIUM, and caller urgency=HIGH, THEN ring-disposition=IMPORTANT. Ring-disposition rules determined by user availability are also contemplated.

Application server 210 hosts application logic 212 to process profile rules 112 and 14 and determine the caller urgency. To determine the urgency, logic 212 prompts the caller by playing a message to the caller: "The party you have called is currently busy—please indicate if this is an important call by pressing 1 for Yes, or 2 for No."

Alternative embodiments use an IVR system to allow the calling party to just speak YES or NO. The called party can customize the message. To contacts designated as IMPORTANT, for instance, the prompt plays a message to the caller such as "I'm currently busy, but if you indicate that the call is important, I will step out to handle this call."

Application logic 212 accepts network triggers for incoming call 316 either through Parlay Gateway 312 or directly through Softswitch 314. Standard PSTN elements to allow the call to be routed to voice mail 318 or directly to subscriber 120. The signaling protocol to convey the ring-disposition to the subscriber depends on the nature of end-user device 120.

In a standard PSTN device, end-device 120 does not possess any intelligence. The PSTN SSP, therefore, is responsible for producing the distinctive rings through existing mechanisms for distinctive ringing.

In a mobile network, mobile device 120 hosts the application intelligence to select the ring-tone, based on the incoming ring disposition 212, conveyed through the signaling protocols over the air interface between network 310 and mobile device 120. If the ring-tones are hosted on client device 120, a setup procedure allows a subscriber to "tag" different ring-tones with incoming ring dispositions 212.

For example, a code representing the ring-disposition decision from network 310 is appended to the calling party ID in the call setup message. Upon the reception and decoding of this information, the client will then be able to alert user 120 with appropriate methods and signals associated with pre-established ring-disposition 212.

Voice over Internet Protocol ("VoIP") terminals having sufficient intelligence operate analogously to the mobile device case. If, however, the endpoint is a dumb handset attached to a VoIP interface, the interface, rather than a central office, includes the hardware and software necessary to generate ring patterns.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in all its aspects. Although the disclosure has been described with reference to particular means, materials and embodiments, the disclosure is not intended to be limited to the particulars disclosed; rather, the disclosure extends to all functionally equivalent technologies, structures, methods and uses such as are within the scope of the appended claims.

What is claimed is:

1. A method comprising:
   receiving, at a destination communication device, information related to a communication from a source communication device;
   determining, at the destination communication device, a designation of the source communication device based on the information;
   selecting, based on the designation, a prompt from multiple prompts, wherein the prompt comprises a first prompt when the designation is a first designation of multiple designations, and wherein the prompt comprises a second prompt when the designation is a second designation of the multiple designations, the first prompt different from the second prompt; and
   sending the prompt from the destination communication device to the source communication device, the prompt to request second information related to urgency of the communication.

2. The method of claim 1, further comprising identifying, based on the designation and based on the second information, a particular destination device for the communication.

3. The method of claim 1, wherein the multiple designations include an emergency priority contact designation, a medium priority contact designation, and a low priority contact designation, and wherein the second information related to the urgency indicates a level of urgency of the communication.

4. The method of claim 3, further comprising:
   in response to the designation indicating the emergency priority contact designation, selecting a personalized prompt as the prompt; and
   in response to the designation indicating the medium priority contact designation or the low priority contact designation, selecting a default prompt as the prompt.

5. The method of claim 1, further comprising:
   receiving a response to the prompt from the source communication device at the destination communication device, the response including the second information;
   determining the urgency of the communication based on the response;
   selecting an alert based on the urgency of the communication and based on the designation, wherein the alert includes an auditory component, a visual component, a tactile component, or a combination thereof; and generating the alert at the destination communication device.

6. The method of claim 5, wherein, when the designation is associated with an emergency priority contact designation and the second information indicates that the communication has high urgency, the alert includes the auditory component, the visual component, and the tactile component.

7. The method of claim 1, further comprising, after sending the prompt, receiving a voice mail corresponding to the communication.

8. The method of claim 1, further comprising, after sending the prompt, receiving a communication setup message from an application server, wherein the communication setup message includes an indicator of the urgency of the communication based on a response to the prompt.

9. The method of claim 8, wherein the communication comprises a telephone call, and wherein the communication setup message comprises a call set up message.

10. A method of processing communication data, the method comprising:

receiving, at a destination communication device, information related to a communication from a source communication device;

determining, at the destination communication device, a designation of the source communication device based on the information;

selecting, based on the designation, a prompt from multiple prompts, wherein the prompt comprises a first prompt when the designation is a first designation of multiple designations, and wherein the prompt comprises a second prompt when the designation is a second designation of the multiple designations, the first prompt different from the second prompt;

sending the prompt from the destination communication device to the source communication device, the prompt to request second information related to urgency of the communication; and identifying, based on the designation and based on the second information, a particular destination device for the communication.

11. The method of claim 10, wherein the particular destination device and the destination communication device are the same device.

12. The method of claim 10, further comprising routing the communication to the particular destination device, wherein the particular destination device corresponds to a different device than the destination communication device, and wherein the particular destination device corresponds to a device that supports a voicemail function.

13. The method of claim 10, further comprising:

in response to receiving the information, accessing a user profile corresponding to the destination communication device, the user profile including a plurality of designations including the designation, wherein the information includes a caller identifier; and identifying the prompt of the multiple prompts that corresponds to the designation of the source communication device, wherein each prompt of the multiple prompts corresponds to a designation type.

14. The method of claim 13, further comprising storing the user profile at the destination communication device prior to receiving the information.

15. The method of claim 13, further comprising, prior to receiving the information:

receiving a first input at the destination communication device, wherein the first input indicates the designation of the source communication device;

updating the user profile to include the designation;

receiving a second input at the destination communication device, wherein the second input indicates the prompt, and wherein the second input indicates that the prompt is associated with the designation; and updating the user profile to include data that indicates that the prompt corresponds to the designation.

16. The method of claim 13, further comprising:

receiving input at the destination communication device, wherein the input indicates a rule, and wherein the rule indicates a particular alert to be generated responsive to determining a particular designation of the source communication device and a particular urgency of the communication; and updating the user profile to include the rule.

17. The method of claim 13, wherein the user profile indicates that a user generated prompt is to be sent in response to determining that a particular designation of a particular device is a family designation.

18. The method of claim 10, wherein the communication comprises a text message.

19. The method of claim 18, wherein the communication comprises a telephone call or a voice over Internet protocol call.

20. The method of claim 10, further comprising, after sending the prompt, receiving a voice mail corresponding to the communication.

* * * * *